United States Patent
Yamamoto

(10) Patent No.: US 9,659,228 B2
(45) Date of Patent: May 23, 2017

(54) IMAGE PROCESSING APPARATUS, IMAGE PROCESSING SYSTEM, NON-TRANSITORY COMPUTER READABLE MEDIUM, AND IMAGE PROCESSING METHOD

(71) Applicant: FUJI XEROX CO., LTD., Tokyo (JP)

(72) Inventor: Takayuki Yamamoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/810,142

(22) Filed: Jul. 27, 2015

(65) Prior Publication Data

US 2016/0275366 A1    Sep. 22, 2016

(30) Foreign Application Priority Data

Mar. 19, 2015  (JP) ................. 2015-056785

(51) Int. Cl.
*G06K 9/66*     (2006.01)
*G06K 9/40*     (2006.01)
(Continued)

(52) U.S. Cl.
CPC ....... *G06K 9/4642* (2013.01); *G06F 3/04842* (2013.01); *G06F 3/04845* (2013.01); *G06T 3/0006* (2013.01); *G06T 11/001* (2013.01); *G06T 2207/10016* (2013.01); *G06T 2207/10024* (2013.01)

(58) Field of Classification Search
CPC .. G06K 9/4642; G06K 9/4609; G06K 9/6203; G06K 9/20; G06T 5/40; G06T 3/0006; G06T 7/0081; G06T 2207/10016; G06T 2207/10024; G06T 5/001; G06F 3/04842; G06F 3/04845

USPC ........ 382/274, 276, 284, 190–231, 162–167; 348/222.1, 239

See application file for complete search history.

(56) References Cited

U.S. PATENT DOCUMENTS 6,996,287 B1 * 2/2006 Weiss .............. G06T 5/50
                                              345/582
7,755,681 B2 * 7/2010 Lee ................ H04N 5/202
                                              348/222.1

(Continued)

FOREIGN PATENT DOCUMENTS

JP    2007-053543 A    3/2007
JP    4648735 B2       3/2011
JP    5387020 B2       1/2014

*Primary Examiner* — Sheela C Chawan
(74) *Attorney, Agent, or Firm* — Oliff PLC

(57) ABSTRACT

An image processing apparatus includes an image information obtaining unit that obtains image information regarding a process target image on which image processing for adjusting an impression of an image to that of a sample image is performed, and image information regarding the sample image, a feature value extraction unit that extracts feature values of the process target image and those of the sample image, an image adjustment unit that adjusts the feature values of the process target image to those of the sample image, and an image display unit that temporarily displays, on the process target image, an image obtained by adjusting the feature values of the process target image to those of the sample image, within a predetermined area in response to a first operation, and thereafter displays an entire image obtained after image processing in response to a second operation.

12 Claims, 14 Drawing Sheets

(51) Int. Cl.
*G06K 9/46* (2006.01)
*G06T 3/00* (2006.01)
*G06F 3/0484* (2013.01)
*G06T 11/00* (2006.01)

(56) References Cited

U.S. PATENT DOCUMENTS

| | | | |
|---|---|---|---|
| 7,864,226 B2* | 1/2011 | Asada | H04N 1/622 348/222.1 |
| 8,537,235 B2* | 9/2013 | Funado | G06T 11/001 348/222.1 |
| 2002/0141005 A1* | 10/2002 | Okisu | G06T 3/4053 358/540 |
| 2004/0165787 A1* | 8/2004 | Perez | G06T 11/40 382/284 |
| 2004/0258302 A1* | 12/2004 | Miwa | G06T 5/008 382/167 |
| 2008/0239104 A1* | 10/2008 | Koh | G06K 9/00221 348/240.99 |
| 2008/0317375 A1* | 12/2008 | Huan | G06T 5/005 382/274 |

* cited by examiner

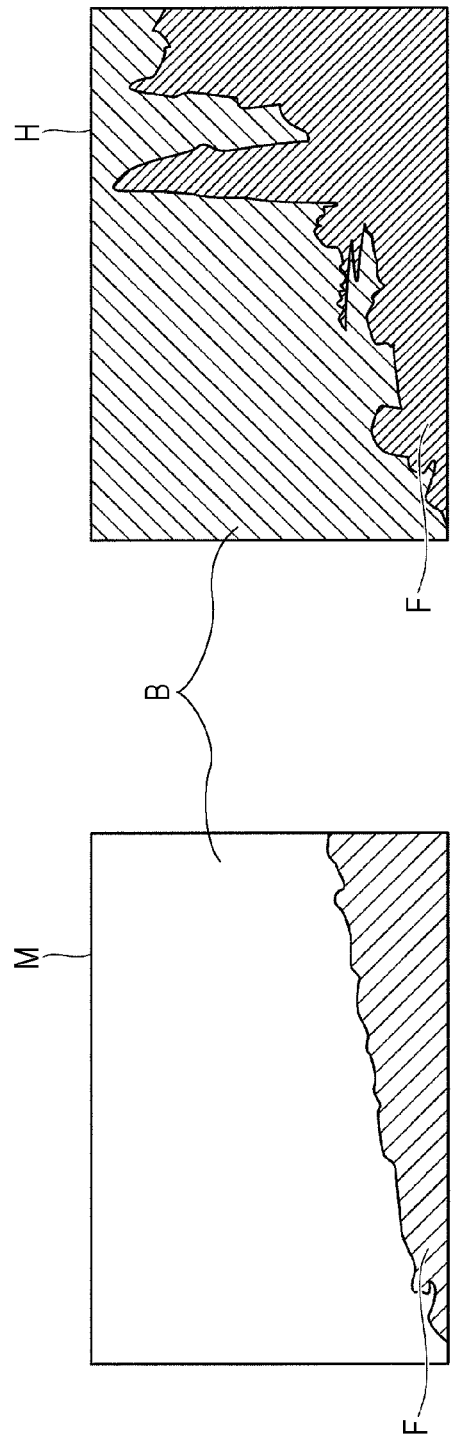

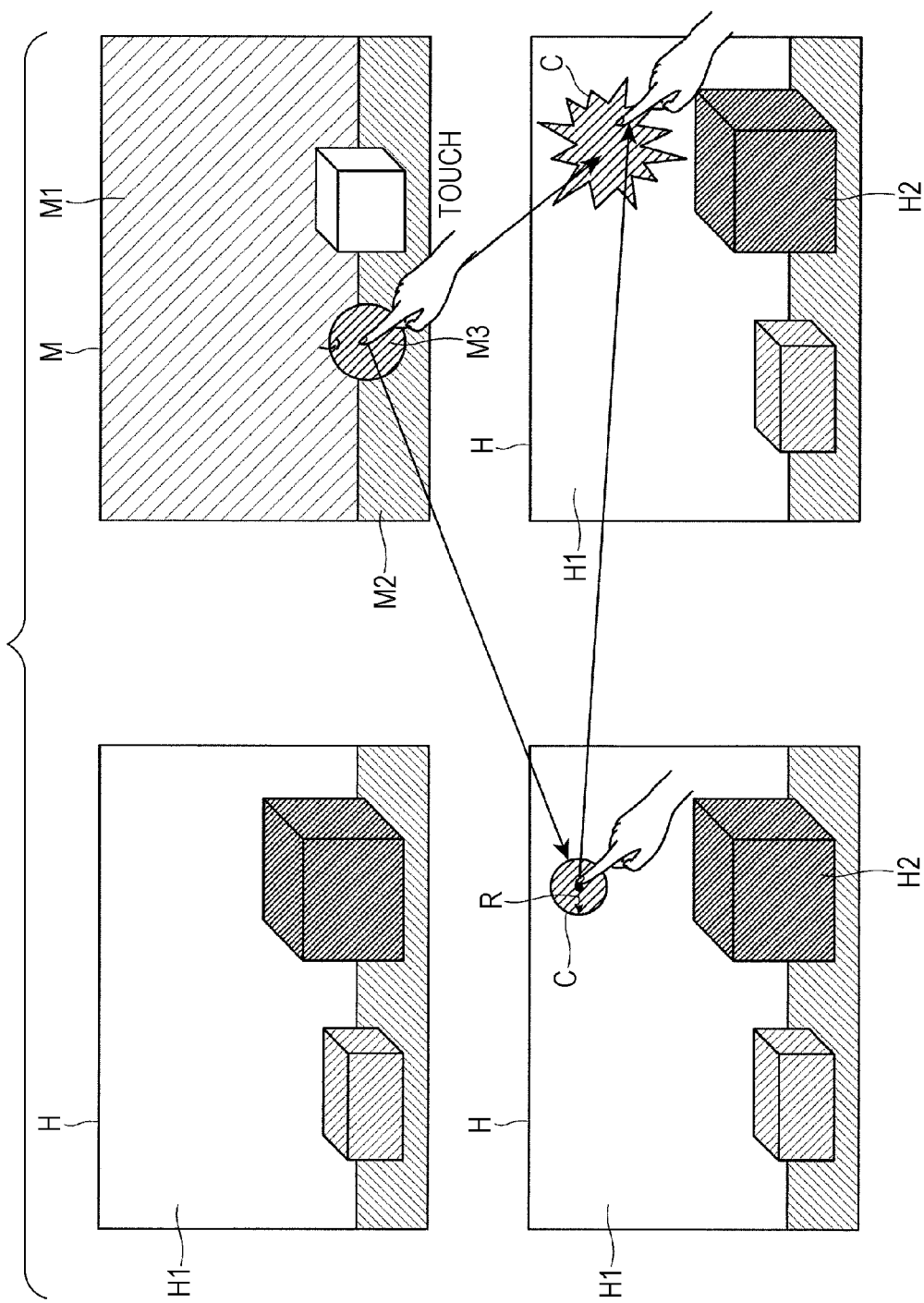

IMAGE PROCESSING APPARATUS, IMAGE PROCESSING SYSTEM, NON-TRANSITORY COMPUTER READABLE MEDIUM, AND IMAGE PROCESSING METHOD

CROSS-REFERENCE TO RELATED APPLICATIONS

This application is based on and claims priority under 35 USC 119 from Japanese Patent Application No. 2015-056785 filed Mar. 19, 2015.

BACKGROUND (i) Technical Field

The present invention relates to an image processing apparatus, an image processing system, a non-transitory computer readable medium, and an image processing method.

(ii) Related Art

With the widespread use of digital cameras and the like, the number of users who capture and view digital images is increasing. Further, with the widespread use of smartphones and tablet computers, there has been an increasing demand for more intuitive operations for image quality adjustment, which is performed by using image editing software for personal computers (PCs), in order to obtain desired images.

The image quality of digital images may be adjusted by adjusting the component values of chromaticity, brightness, hue, and saturation in a color space, such as a Red-Green-Blue (RGB) color space, a CIE L*a*b* color space, or a Hue-Saturation-Value (HSV) color space, or the contrast thereof, for example. In this adjustment, image processing may be performed in which the image quality of a process target image is adjusted to the image quality of a sample image that is a sample specified by a user.

SUMMARY

According to an aspect of the invention, there is provided an image processing apparatus including an image information obtaining unit, a feature value extraction unit, an image adjustment unit, and an image display unit. The image information obtaining unit obtains image information regarding a process target image on which image processing for adjusting an impression of an image to an impression of a sample image is performed, and image information regarding the sample image. The feature value extraction unit extracts feature values of the process target image and feature values of the sample image. The image adjustment unit adjusts the feature values of the process target image to the feature values of the sample image. The image display unit temporarily displays, on the process target image, an image obtained by adjusting the feature values of the process target image to the feature values of the sample image, within a predetermined area in response to a first operation that is performed by a user on the process target image, and thereafter displays an entire image obtained after image processing in response to a second operation that is performed by the user on the process target image.

BRIEF DESCRIPTION OF THE DRAWINGS

Exemplary embodiments of the present invention will be described in detail based on the following figures, wherein:

FIGS. 1A and 1B are diagrams illustrating image processing for adjusting the image quality of a process target image to the image quality of a sample image;

FIG. 14 is a diagram illustrating images displayed on the display device by the image display unit.

DETAILED DESCRIPTION

Description of Image Processing

Figure 2:
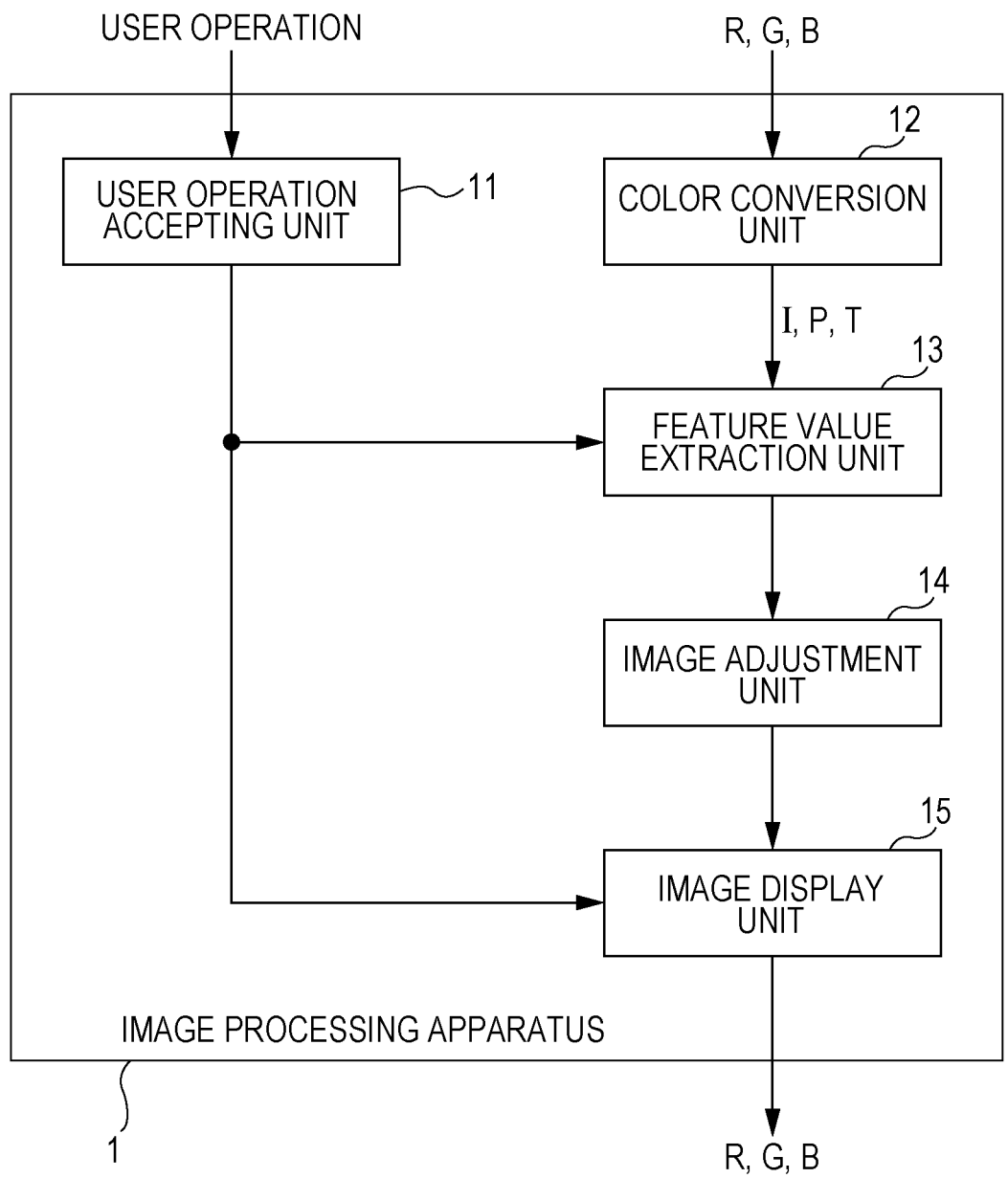
FIG. 2 is a block diagram illustrating an example of a functional configuration of an image processing apparatus according to an exemplary embodiment.

Hereinafter, exemplary embodiments of the present invention will be described in detail with reference to the attached drawings.

FIGS. 1A and 1B are diagrams illustrating image processing for adjusting the image quality of a process target image to the image quality of a sample image.

FIG. 1A illustrates a sample image and a process target image before image processing.

Here, a sample image M is illustrated on the left of FIG. 1A, and a process target image H is illustrated on the right of FIG. 1A. In the exemplary embodiments, a process target image is an image that is subjected to image processing, and a sample image is an image that includes an image having an impression which a user desires and that serves as a sample used when image processing is performed on the process target image.

Typically, the sample image M and the process target image H are displayed on a display device, such as a liquid crystal panel or a liquid crystal display. Image processing is performed by processing image information using image editing software that operates on a tablet computer, a smartphone, a PC, or the like. A user performs an operation for image processing by operating a menu and the like displayed on the display device together with the sample image M and the process target image H in accordance with operation of the image editing software. In a case of using a tablet computer or a smartphone, the user operation is performed by the user touching the liquid crystal panel, which is a touch panel, with a finger or a stylus, for example. In a case of using a PC, the user operation is performed by using a keyboard, a mouse, and the like connected to the PC. In the above-described cases, a functional unit of the tablet computer or the smartphone which performs image processing and the PC are each regarded as an example of an image processing apparatus that performs image processing on image information regarding an image displayed on the display device. Further, the image processing apparatus and the display device are together regarded as an example of an image processing system.

The sample image M and the process target image H that are illustrated are each formed of a foreground F that is an image of the ground and a background B that is an image of the sky.

It is assumed that the user desires to change the process target image H to an image having an impression similar to that of the background B of the sample image M by performing image processing on the process target image H. This case corresponds to a case of, if the background B of the sample image M is an image of a red sky, and the background B of the process target image H is an image of a blue sky, changing the background B of the process target image H to the image of a red sky.

FIG. 1B illustrates the process target image after image processing.

In the process target image H after image processing illustrated in FIG. 1B, the color of the background B becomes the same as the background B of the sample image M, and therefore, an image impression received from the process target image H becomes closer to that received from the sample image M.

Description of Configuration of Image Processing Apparatus

First Exemplary Embodiment

A description of a first exemplary embodiment is given first.

FIG. 2 is a block diagram illustrating an example of a functional configuration of an image processing apparatus 1 according to this exemplary embodiment.

As illustrated in FIG. 2, the image processing apparatus 1 includes a user operation accepting unit 11, a color conversion unit 12, a feature value extraction unit 13, an image adjustment unit 14, and an image display unit 15. The user operation accepting unit 11 accepts the details of a user operation. The color conversion unit 12 obtains image information (input image data) regarding a process target image and a sample image, performs color conversion, and obtains chromaticity components and brightness components. The feature value extraction unit 13 extracts feature values from image information obtained after color conversion. The image adjustment unit 14 performs a process for adjusting feature values of the process target image to those of the sample image in accordance with a user instruction. The image display unit 15 displays, on the display device, an image obtained by adjusting the feature values of the process target image to those of the sample image in accordance with a user operation.

The user operation accepting unit 11 accepts a control signal that indicates the details of an operation performed by a user on a process target image or a sample image. This operation, which will be described in detail below, corresponds to an operation of touching or dragging on a touch panel by using a finger or a stylus in a case where the user operates a tablet computer or a smartphone. In a case where the user operates a PC, an operation of clicking or dragging by using a mouse or the like corresponds to the operation.

The color conversion unit 12 performs color conversion on input image data that is used to display a process target image and a sample image on the display device. In this case, the input image data is RGB video data (RGB data). The RGB data is converted into IPT data, for example. That is, the chromaticity in an RGB color space is converted into the chromaticity in an IPT color space. An IPT color space is an orthogonal coordinate color space composed of three components of lightness (I), chromaticity in the red-green direction (P), and chromaticity in the yellow-blue direction (T). In this exemplary embodiment, lightness (I) is assumed to be a brightness component, and chromaticity in the red-green direction (P) and chromaticity in the yellow-blue direction (T) are assumed to be chromaticity components. The color conversion unit 12 is regarded as an example of an image information obtaining unit that obtains image information regarding a process target image and a sample image.

The feature value extraction unit 13 extracts image feature values for each of a process target image and a sample image. A feature value is an indicator that determines the impression of an image received by a user who views the image. In this exemplary embodiment, the mean and the distribution of pixel values of pixels that constitute a process target image is assumed to be feature values of the process target image, and the mean and the distribution of pixel values of pixels that constitute a sample image is assumed to be feature values of the sample image. A pixel value is composed of a brightness component (I) and chromaticity components (P, T). Accordingly, a feature value is extracted for each of the brightness component (I) and the chromaticity components (P, T). Note that, in this exemplary embodiment, an arithmetic mean is used as the mean, and a variance is used as the distribution.

More specifically, the feature value extraction unit 13 calculates the arithmetic means of the brightness components (I) and the chromaticity components (P, T) of pixels that constitute a process target image, and calculates the arithmetic means of the brightness components (I) and the chromaticity components (P, T) of pixels that constitute a sample image. Further, the feature value extraction unit 13 calculates the variances of the brightness components (I) and the chromaticity components (P, T) of the pixels that constitute the process target image, and calculates the variances of the brightness components (I) and the chromaticity components (P, T) of the pixels that constitute the sample image.

The arithmetic mean is calculated for each of the process target image and the sample image and for each of I, P, and T that are the brightness component and the chromaticity components, and therefore, six values are obtained in total. The arithmetic means are calculated by using expressions 1 below.

In expressions 1, $I_{i,j}$ represents the I value of each pixel that constitutes an image in a process target image or a sample image at a position (i, j). $P_{i,j}$ represents the P value of each pixel that constitutes an image in the process target image or the sample image at the position (i, j). $T_{i,j}$ represents the T value of each pixel that constitutes an image in the process target image or the sample image at the position (i, j).

$\mu_{It}$ represents the arithmetic mean of the I values of the process target image. $\mu_{Pt}$ represents the arithmetic mean of the P values of the process target image. $\mu_{Tt}$ represents the arithmetic mean of the T values of the process target image.

$\mu_{Ir}$ represents the arithmetic mean of the I values of the sample image. $\mu_{Pr}$ represents the arithmetic mean of the P values of the sample image. $\mu_{Tr}$ represents the arithmetic mean of the T values of the sample image.

$$\mu_{It} = \frac{1}{ij}\sum(I_{i,j}), \mu_{Pt} = \frac{1}{ij}\sum(P_{i,j}), \mu_{Tt} = \frac{1}{ij}\sum(T_{i,j}) \quad (1)$$

$$\mu_{Ir} = \frac{1}{ij}\sum(I_{i,j}), \mu_{Pr} = \frac{1}{ij}\sum(P_{i,j}), \mu_{Tr} = \frac{1}{ij}\sum(T_{ij})$$

The variance is also calculated for each of the process target image and the sample image and for each of I, P, and T that are the brightness component and the chromaticity components, and therefore, six values are obtained in total. The variances are calculated by using expressions 2 below.

In expressions 2, $I_{i,j}$, $P_{i,j}$, and $T_{i,j}$ are the same as in expressions 1.

$\sigma_{It}^2$ represents the variance of the I values of the process target image. $\sigma_{Pt}^2$ represents the variance of the P values of the process target image. $\sigma_{Tt}^2$ represents the variance of the T values of the process target image.

$\sigma_{Ir}^2$ represents the variance of the I values of the sample image. $\sigma_{Pr}^2$ represents the variance of the P values of the sample image. $\sigma_{Tr}^2$ represents the variance of the T values of the sample image.

$$\sigma_{It}^2 = \frac{1}{ij}\sum(I_{i,j}-\mu_{It})^2, \sigma_{Pt}^2 = \frac{1}{ij}\sum(P_{i,j}-\mu_{Pt})^2, \quad (2)$$

$$\sigma_{Tt}^2 = \frac{1}{ij}\sum(T_{i,j}-\mu_{Tt})^2$$

$$\sigma_{Ir}^2 = \frac{1}{ij}\sum(I_{i,j}-\mu_{Ir})^2, \sigma_{Pr}^2 = \frac{1}{ij}\sum(P_{i,j}-\mu_{Pr})^2,$$

$$\sigma_{Tr}^2 = \frac{1}{ij}\sum(T_{i,j}-\mu_{Tr})^2$$

The image adjustment unit 14 adjusts feature values of a process target image in accordance with those of a sample image.

Here, the image adjustment unit 14 performs a process for making the arithmetic mean and the variance of pixels of a process target image closer to those of a sample image by using the arithmetic mean and the variance of the brightness components and the chromaticity components of the process target image and those of the sample image.

This process is performed by using expressions 3 to 5 below. Expression 3 is an arithmetic expression for I values, where represents the I value of each pixel that constitutes an image in the process target image before adjustment at the position (i, j), and $I'_{i,j}$ represents the I value of each pixel that constitutes an image in the process target image after adjustment at the position (i, j).

Expression 4 is an arithmetic expression for P values, where $P_{i,j}$ represents the P value of each pixel that constitutes an image in the process target image before adjustment at the position (i, j), and $P'_{i,j}$ represents the P value of each pixel that constitutes an image in the process target image after adjustment at the position (i, j).

Expression 5 is an arithmetic expression for T values, where $T_{i,j}$ represents the T value of each pixel that constitutes an image in the process target image before adjustment at the position (i, j), and $T'_{i,j}$ represents the T value of each pixel that constitutes an image in the process target image after adjustment at the position (i, j).

By calculating expressions 3 to 5, the brightness component (I) and the chromaticity components (P, T) are adjusted in accordance with the sample image for each pixel that constitutes an image in the process target image at the position (i, j).

$$I'_{i,j} = (I_{i,j}-\mu_{It})\frac{\sigma_{Ir}}{\sigma_{It}}+\mu_{Ir} \quad (3)$$

$$P'_{i,j} = (P_{i,j}-\mu_{Pt})\frac{\sigma_{Pr}}{\sigma_{Pt}}+\mu_{Pr} \quad (4)$$

$$T'_{i,j} = (T_{i,j}-\mu_{Tt})\frac{\sigma_{Tr}}{\sigma_{Tt}}+\mu_{Tr} \quad (5)$$

Figure 3A:
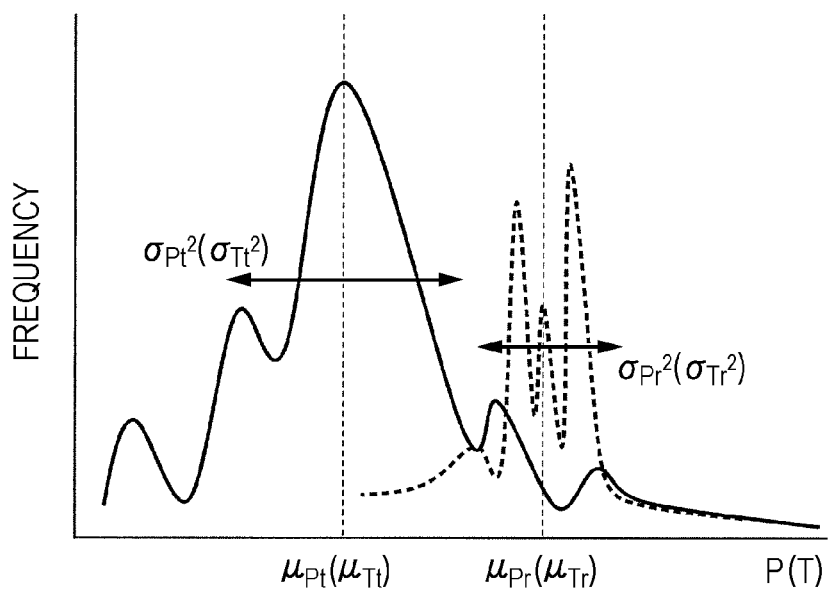
FIG. 3A is a conceptual diagram illustrating histograms of a process target image and a sample image before image processing.

FIG. 3A is a conceptual diagram illustrating histograms of a process target image and a sample image before image processing.

In FIG. 3A, the horizontal axis represents the chromaticity component, namely, the P value or the T value. The vertical axis represents the frequency (number of pixels). Here, the solid line represents a histogram of a process target image, and the dotted line represents a histogram of a sample image. In this case, the arithmetic mean $\mu_{Pt}$ (or $\mu_{Tt}$) of the process target image is different from the arithmetic mean $\mu_{Pr}$ (or $\mu_{Tr}$) of the sample image because image processing is not performed. The variance $\sigma_{Pt}$ (or $\sigma_{Tt}$) of the process target image is also different from the variance $\sigma_{Pr}$ (or $\sigma_{Tr}$) of the sample image.

Figure 3B:
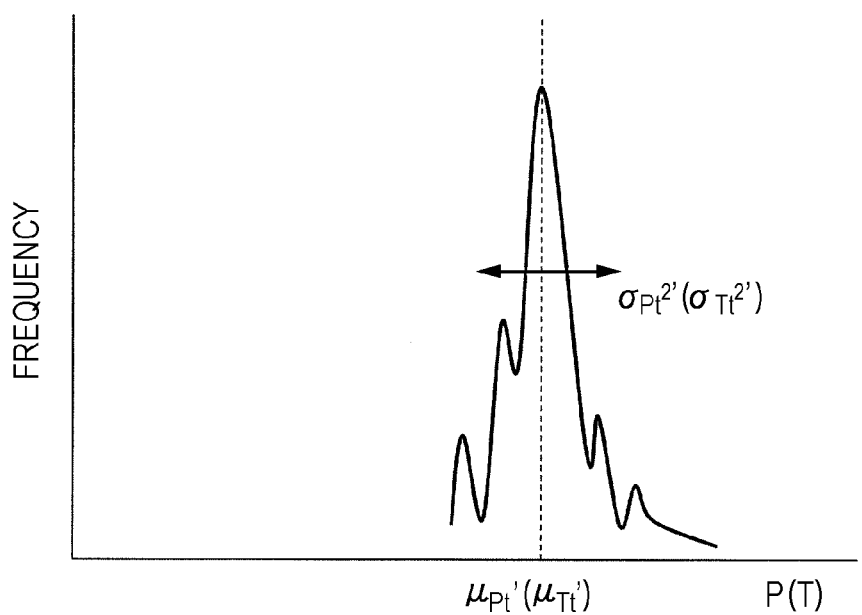
FIG. 3B is a conceptual diagram illustrating a histogram of the process target image after chromaticity components have been adjusted by an image adjustment unit.

FIG. 3B is a conceptual diagram illustrating a histogram of the process target image after the chromaticity component has been adjusted by the image adjustment unit 14.

In FIG. 3B, the horizontal axis represents the chromaticity component, namely, the P value or the T value. The vertical axis represents the frequency (number of pixels). In this case, the arithmetic mean of the process target image matches that of the sample image after the chromaticity component has been adjusted by the image adjustment unit 14. The variance of the process target image also matches that of the sample image.

Figure 4:
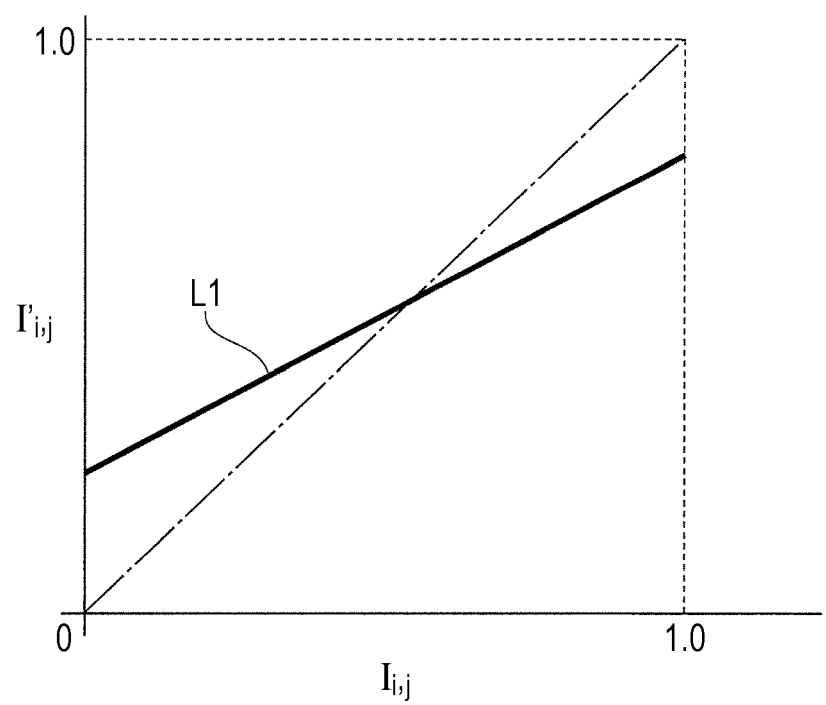
FIG. 4 is a diagram illustrating brightness adjustment performed by the image adjustment unit as an adjustment tone curve.

FIG. 4 is a diagram illustrating brightness adjustment performed by the image adjustment unit 14 as an adjustment tone curve.

Here, the horizontal axis represents the I value before adjustment ($I_{i,j}$), and the vertical axis represents the I value after adjustment ($I'_{i,j}$).

In this example, the adjustment tone curve becomes a straight line represented by L1.

The image display unit 15 temporarily displays an image obtained by adjusting feature values of a process target image to those of a sample image, on the process target image within a predetermined area in accordance with a first operation performed by a user on the process target image. In this case, the image temporarily displayed on the process target image has an image quality which has been adjusted to that of the sample image.

Figure 5:
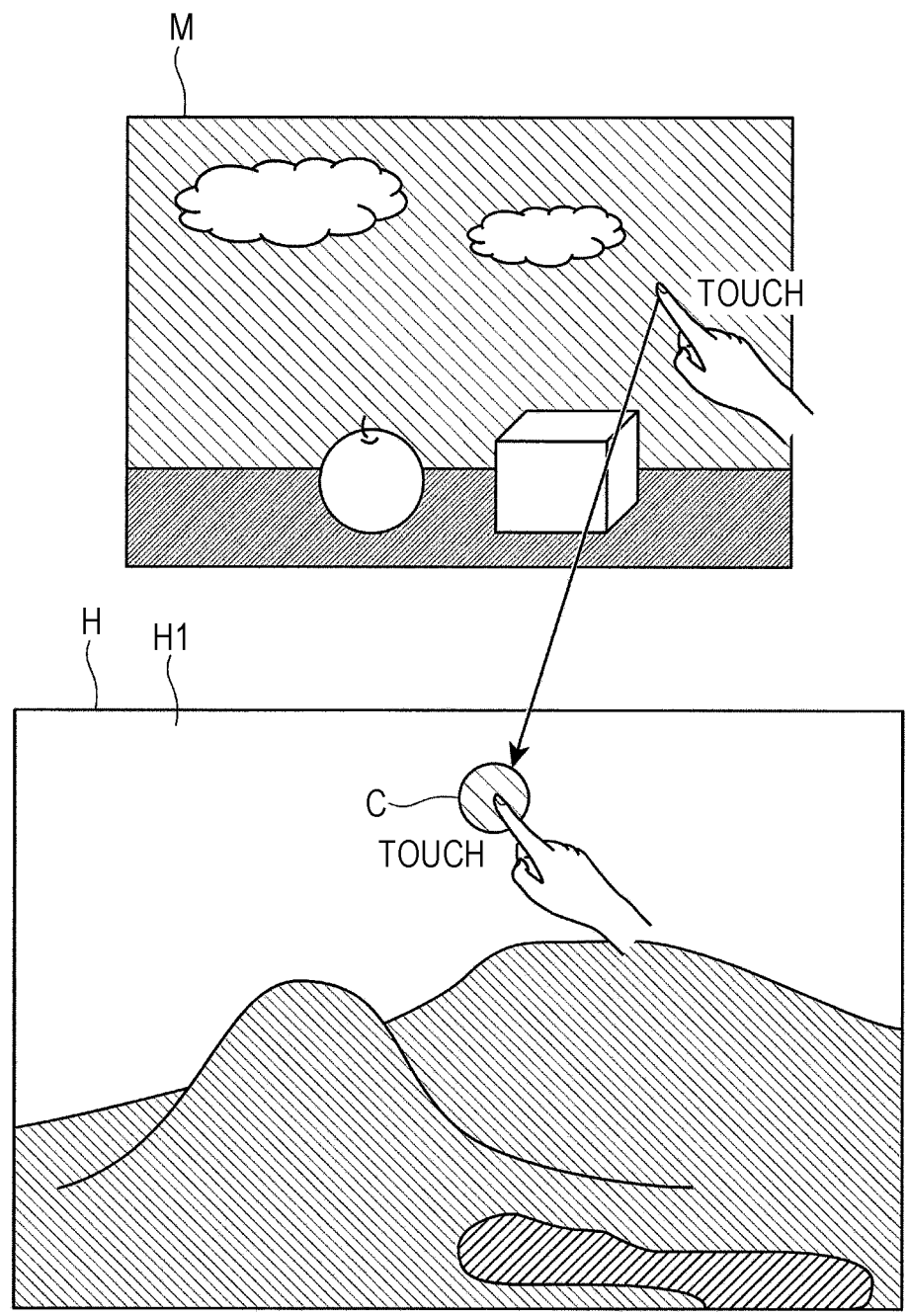
FIG. 5 is a diagram illustrating an example of a process performed in a first exemplary embodiment.

FIG. 5 is a diagram illustrating an example of a process performed in the first exemplary embodiment.

In FIG. 5, a sample image M is illustrated in the upper part of FIG. 5, and a process target image H is illustrated in the lower part of FIG. 5. Hereinafter, a description is given while assuming that a user uses a tablet computer or a smartphone and performs an operation by touching the display device with a finger or a stylus, for example.

First, a user touches any location on the sample image M. This touch operation is an operation for the user to specify the sample image M, and is accepted by the user operation accepting unit 11. In a case where the user performs the operation for specifying the sample image M by using a mouse or the like, the user clicks any location on the sample image M.

Next, the user releases the finger or the stylus from the sample image M, and touches (or clicks in the case of using a mouse or the like) any location on the process target image H. This touch operation is an operation for the user to specify the process target image H, and is accepted by the user operation accepting unit 11. Note that the user need not release the finger or the stylus from the sample image M, and may perform a drag operation of dragging to the process target image H without releasing the finger or the stylus from the sample image M. Note that the touch or click operation or the drag operation is an example of the above-described first operation performed by a user.

The image display unit 15 temporarily displays an image obtained by adjusting the image quality of the process target image H to that of the sample image M, on the process target image H within a predetermined area. In FIG. 5, the image obtained by adjustment is displayed in a portion in a sky image H1 in the process target image H as a circle C. The center of the circle C corresponds to the position at which the user has touched the process target image H. The image within the circle C is the image obtained after adjusting the image quality of the process target image H to that of the sample image M. Accordingly, the user is able to easily know in advance the result of image processing. Note that the image within the circle C may be a uniform image or an image having a texture. In a case of using an image having a texture, the look of an image obtained after image processing is expressed by the texture, for example.

Note that in this state, the image after image processing is temporarily displayed within the circle C as a sample, and image processing is not fully performed on the process target image H. The image display unit 15 displays the entire image after image processing in response to a second operation performed by the user on the process target image H.

In order to fully perform image processing on the process target image H, the user releases the finger or the stylus that is in contact with the process target image H. This release operation is an operation for providing an instruction for performing image processing on the process target image H, and is accepted by the user operation accepting unit 11. In a case where the user performs the operation for providing an instruction by using a mouse or the like, the user cancels the clicking.

Then, the image display unit 15 erases the temporarily displayed circle C, performs image processing on the entire process target image H, and displays, on the display device, the entire image obtained after image processing. This image, namely, the process target image H obtained after image processing, has the same image impression as the sample image M has. Note that the operation of releasing the finger or the stylus that is in contact with the process target image H or the operation of cancelling the clicking is an example of the above-described second operation performed by a user.

In a case where the user does not desire to perform image processing, the user performs a drag operation of moving the finger or the stylus that is in contact with the process target image H to any location outside the process target image H, and thereafter releasing the finger or the stylus. This drag operation is an operation for not performing image processing on the process target image H, and is accepted by the user operation accepting unit 11. Then, the image display unit 15 erases the temporarily displayed circle C.

Note that, in the above-described example, although the circle C is used as the predetermined area within which the image obtained after image processing is temporarily displayed, the predetermined area is not limited to the circle C, and may be any predetermined figure, such as a rectangle or a triangle, for example.

Specifically, the image display unit 15 reconverts image data obtained after image processing, namely, $P'_{i,j}$ and $T'_{i,j}$, into the format of input image data obtained by the color conversion unit 12, and outputs the result on the display device. That is, the image display unit 15 restores the IPT data to RGB data and outputs the result on the display device.

Figure 6:
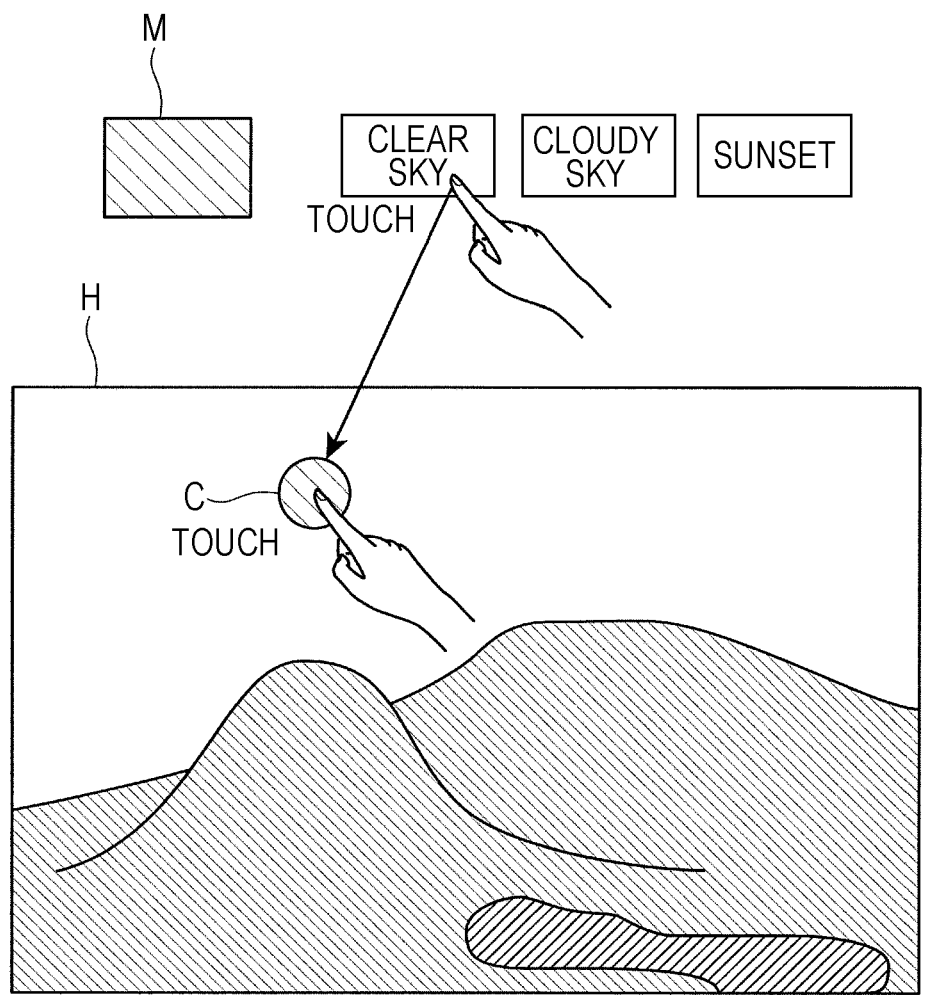
FIG. 6 is a diagram illustrating another example of the process performed in the first exemplary embodiment.

FIG. 6 is a diagram illustrating another example of the process performed in the first exemplary embodiment.

In FIG. 6, a sample image M and images that represent keywords related to the sample image M are illustrated in the upper part of FIG. 6, and a process target image H is illustrated in the lower part of FIG. 6. Here, a case is illustrated where three keywords of "clear sky", "cloudy sky", and "sunset" are displayed.

In this state, a user touches the keyword "clear sky" with a finger or a stylus, for example. Then, a blue image, which is an image of a clear sky, is displayed as the sample image M. In a case where the user touches the keyword "cloudy sky", a gray image, which is an image of a cloudy sky, is displayed as the sample image M. In a case where the user touches the keyword "sunset", a red image, which is an image of a sunset, is displayed as the sample image M.

Operations that are performed thereafter are similar to the case described with reference to FIG. 5. That is, the user releases the finger or the stylus that is in contact with the image that represents a selected keyword and thereafter touches any location on the process target image H. As a result, an image obtained by adjusting the image quality of the process target image H to that of the sample image M is temporarily displayed on the process target image H as a circle C. Note that the user need not release the finger or the stylus from the image that represents a selected keyword, and may drag the image that represents a selected keyword to the process target image H while keeping the finger or the stylus in contact with the image that represents a selected keyword.

When the user releases the finger or the stylus from the process target image H, image processing is performed on the process target image H, and the process target image H obtained after image processing is displayed on the display device.

Note that the user operations are accepted by the user operation accepting unit 11 and the image is changed by the image display unit 15 in a similar manner to the case described with reference to FIG. 5.

Second Exemplary Embodiment

A description of a second exemplary embodiment is given next.

In the first exemplary embodiment, although the feature value extraction unit 13 extracts feature values that reflect the impression of the entire sample image, feature values that are extracted are not limited to such feature values. In this exemplary embodiment, a user specifies an image region having an impression that the user desires to use as a sample from a sample image, and feature values are extracted.

An example of a functional configuration of the image processing apparatus 1 in this exemplary embodiment is similar to that illustrated in FIG. 2. Further, the functions of the user operation accepting unit 11, the color conversion unit 12, the image adjustment unit 14, and the image display unit 15 are similar to those in the first exemplary embodiment. Accordingly, a description is given of the feature value extraction unit 13 which is different from that in the first exemplary embodiment.

In this exemplary embodiment, the feature value extraction unit 13 selects a first image region that is a predetermined area from a location specified by a user on a sample image, and extracts feature values of the first image region as feature values of the sample image.

The first image region is a circle region that is centered at the location on the sample image which the user has touched and that has a radius of up to 10 pixels, for example. That is, in this exemplary embodiment, the user needs to touch an image region that the user desires to use as a sample, not an arbitrary location on the sample image.

Figure 7:
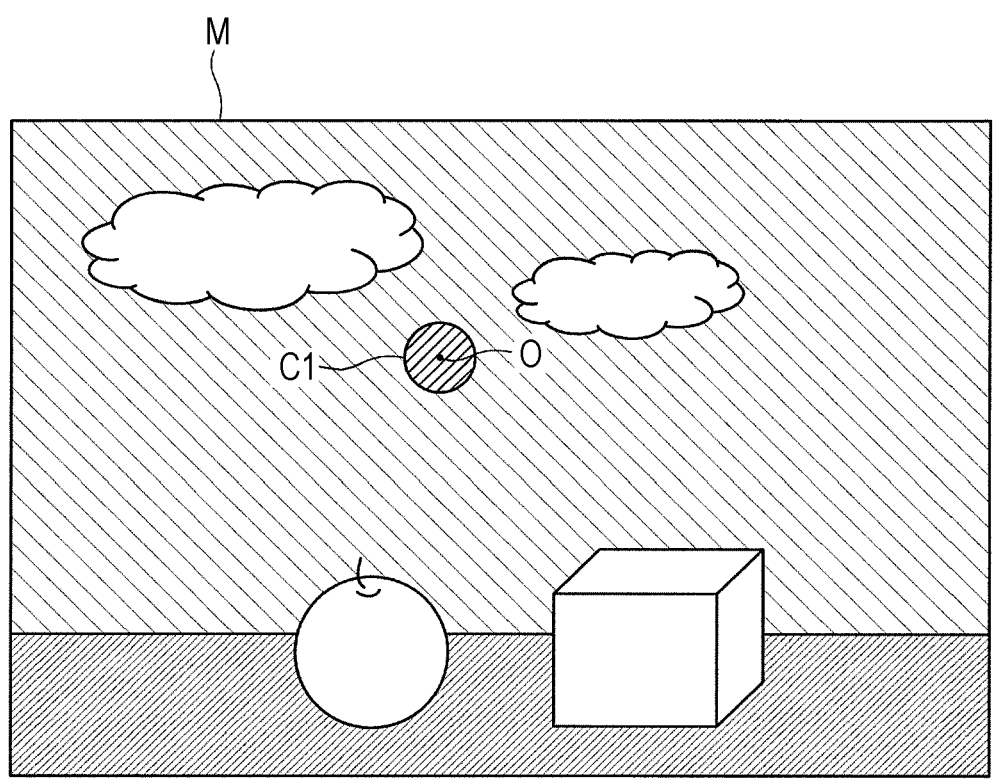
FIG. 7 is a diagram illustrating a circle region.

FIG. 7 is a diagram illustrating the circle region.

A point O illustrated in FIG. 7 is a position at which a user has touched a sample image M. A portion denoted by C1 corresponds to the circle region, and the circle region C1 is displayed on the sample image M.

The feature value extraction unit 13 calculates the arithmetic means of the brightness components (I) and the chromaticity components (P, T) of pixels within the circle region C1.

The arithmetic means are calculated by using expressions 6 below.

In expressions 6, $I_{RR(i,j)}$ represents the I value of each pixel within the circle region C1 at a position (i, j). $P_{RR(i,j)}$ represents the P value of each pixel within the circle region C1 at the position (i, j). $T_{RR(i,j)}$ represents the T value of each pixel within the circle region C1 at the position (i, j). N represents the number of pixels within the circle region C1.

$\mu_{I\_RR}$ represents the arithmetic mean of the I values of the pixels within the circle region C1. $\mu_{P\_PR}$ represents the arithmetic mean of the P values of the pixels within the circle region C1. $\mu_{T\_RR}$ represents the arithmetic mean of the T values of the pixels within the circle region C1.

$$\mu_{I\_RR} = \frac{1}{N}\sum (I_{RR(i,j)}),\ \mu_{P\_RR} = \frac{1}{N}\sum (P_{RR(i,j)}), \quad (6)$$
$$\mu_{T\_RR} = \frac{1}{N}\sum (T_{RR(i,j)})$$

The Euclidean distance, in an IPT color space, between each pixel in the sample image M and the arithmetic mean of the pixel values of the pixels within the circle region C1 is calculated by using expression 7 below, and the result is assumed to be a feature value obtainment mask $M_{R(i,j)}$. In expression 7, F represents a function for limiting the feature value obtainment mask $M_{R(i,j)}$ to a range between 0 and 1, and is used to adjust the dynamic range of the feature value obtainment mask $M_{R(i,j)}$.

$$M_{R(i,j)} = F * \sqrt{(I_{i,j} - \mu_{I\_RR})^2 + (P_{i,j} - \mu_{P\_RR})^2 + (T_{i,j} - \mu_{T\_RR})^2} \quad (7)$$

Then, the arithmetic mean $\mu_{Ir}$ of the I values, the arithmetic mean $\mu_{Pr}$ of the P values, and the arithmetic mean $\mu_{Tr}$ of the T values are calculated as feature values of the sample image M by using expressions 8 below. Note that the arithmetic mean $\mu_{Ir}$ of the I values, the arithmetic mean $\mu_{Pr}$ of the P values, and the arithmetic mean $\mu_{Tr}$ of the T values, which represent feature values of the process target image H, are similar to those in the first exemplary embodiment.

The variance $\sigma_{Ir}^2$ of the I values, the variance $\sigma_{Pr}^2$ of the P values, and the variance $\sigma_{Tr}^2$ of the T values are calculated as feature values of the sample image M by using expressions 9 below. Note that the variance $\sigma_{It}^2$ of the I values, the variance $\sigma_{Pt}^2$ of the P values, and the variance $\sigma_{Tt}^2$ of the T values, which represent feature values of the process target image H, are similar to those in the first exemplary embodiment.

In this case, a region in the sample image M from which feature values are extracted is limited by the feature value obtainment mask $M_{R(i,j)}$. Specifically, feature values are extracted from an image region that includes pixels having pixel values closer to the pixel values of pixels within the circle region C1. That is, feature values are extracted from an image region selected by the user.

$$\mu_{Ir} = \frac{1}{ij}\sum (I_{i,j} M_{R(i,j)}),\ \mu_{Pr} = \frac{1}{ij}\sum (P_{i,j} M_{R(i,j)}), \quad (8)$$
$$\mu_{Tr} = \frac{1}{ij}\sum (T_{i,j} M_{R(i,j)})$$

$$\sigma_{Ir}^2 = \frac{1}{ij}\sum (I_{i,j} M_{R(i,j)} - \mu_{Ir})^2, \quad (9)$$
$$\sigma_{Pr}^2 = \frac{1}{ij}\sum (P_{i,j} M_{R(i,j)} - \mu_{Pr})^2,$$
$$\sigma_{Tr}^2 = \frac{1}{ij}\sum (T_{i,j} M_{R(i,j)} - \mu_{Tr})^2$$

Figure 8:
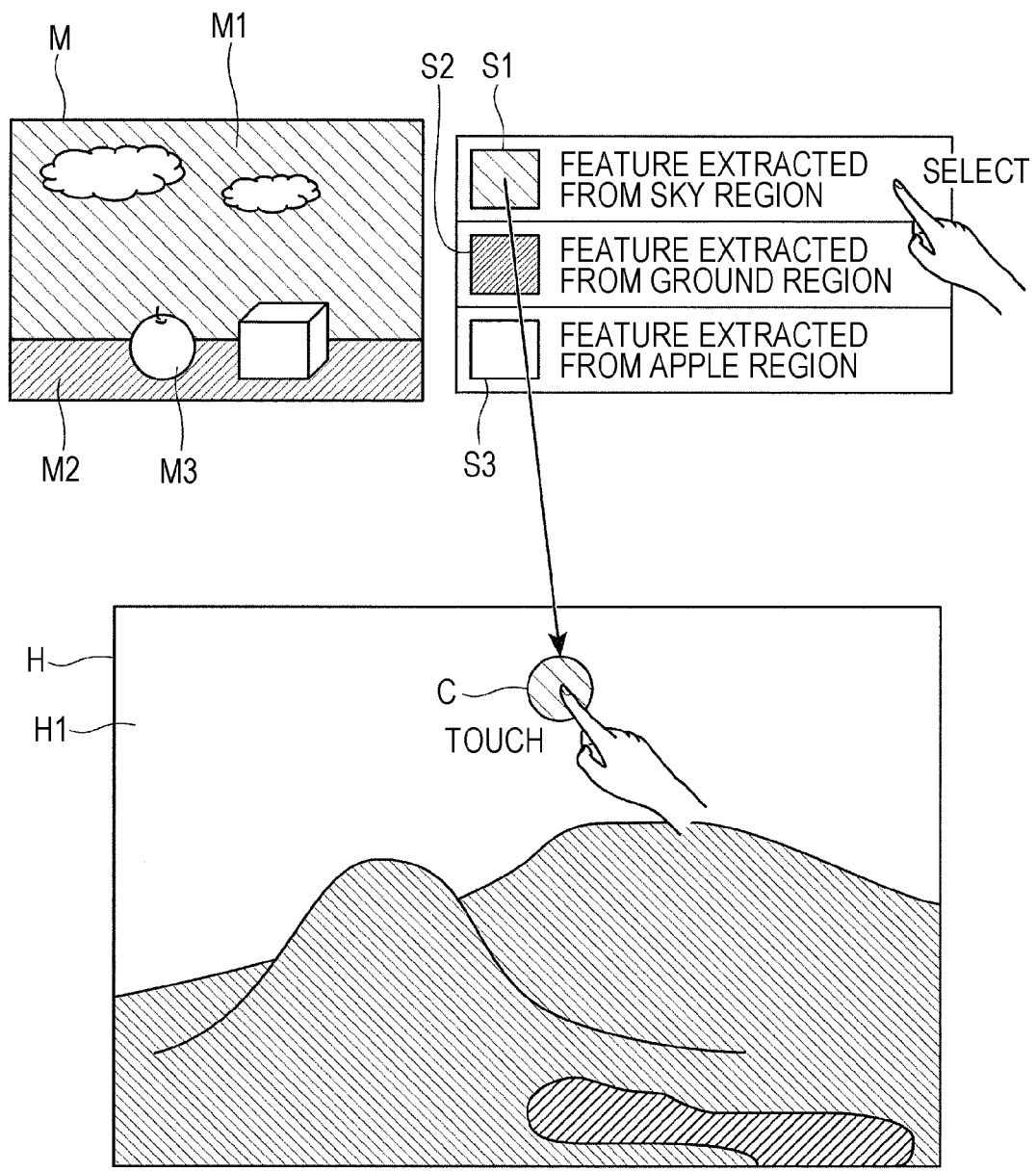
FIG. 8 is a diagram illustrating an example of a process performed in a second exemplary embodiment.

FIG. 8 is a diagram illustrating an example of a process performed in the second exemplary embodiment.

In FIG. 8, a sample image M is illustrated in the upper part of FIG. 8, and a process target image H is illustrated in the lower part of FIG. 8. Images S1, S2, and S3 based on feature values extracted by the feature value extraction unit 13 are illustrated beside the sample image M. FIG. 8 illustrates a case where a user touches three locations, namely, a sky image M1, a ground image M2, and an apple image M3 in the sample image M, for example, and the feature value extraction unit 13 extracts feature values in response to the touch operation. As a result, the three images S1, S2, and S3 that respectively correspond to the sky image M1, the ground image M2, and the apple image M3 are displayed as images based on the feature values extracted by the feature value extraction unit 13.

In this state, the user selects the image S1 based on the sky image M1, for example, by performing a touch operation. This touch operation is an operation for the user to specify the image S1, and is accepted by the user operation accepting unit 11.

Then, the user releases the finger or the stylus from the image S1, and touches a location in a sky image H1 in the process target image H, for example. This touch operation is an operation for the user to specify the process target image H, and is accepted by the user operation accepting unit 11.

The image display unit 15 temporarily displays an image adjusted to the feature values of the image S1 on the process target image H within a predetermined area. In FIG. 8, the adjusted image is displayed on the process target image H as a circle C.

Then, the user releases the finger or the stylus that is in contact with the process target image H. This release operation is an operation for providing an instruction for performing image processing on the process target image H, and is accepted by the user operation accepting unit 11. The image display unit 15 performs image processing on the process target image H, and displays, on the display device, an image after image processing obtained by adjusting the feature values of the process target image H to those of the image S1. This image, namely, the process target image H obtained after image processing, has the same image impression as the image S1 has.

Figure 9:
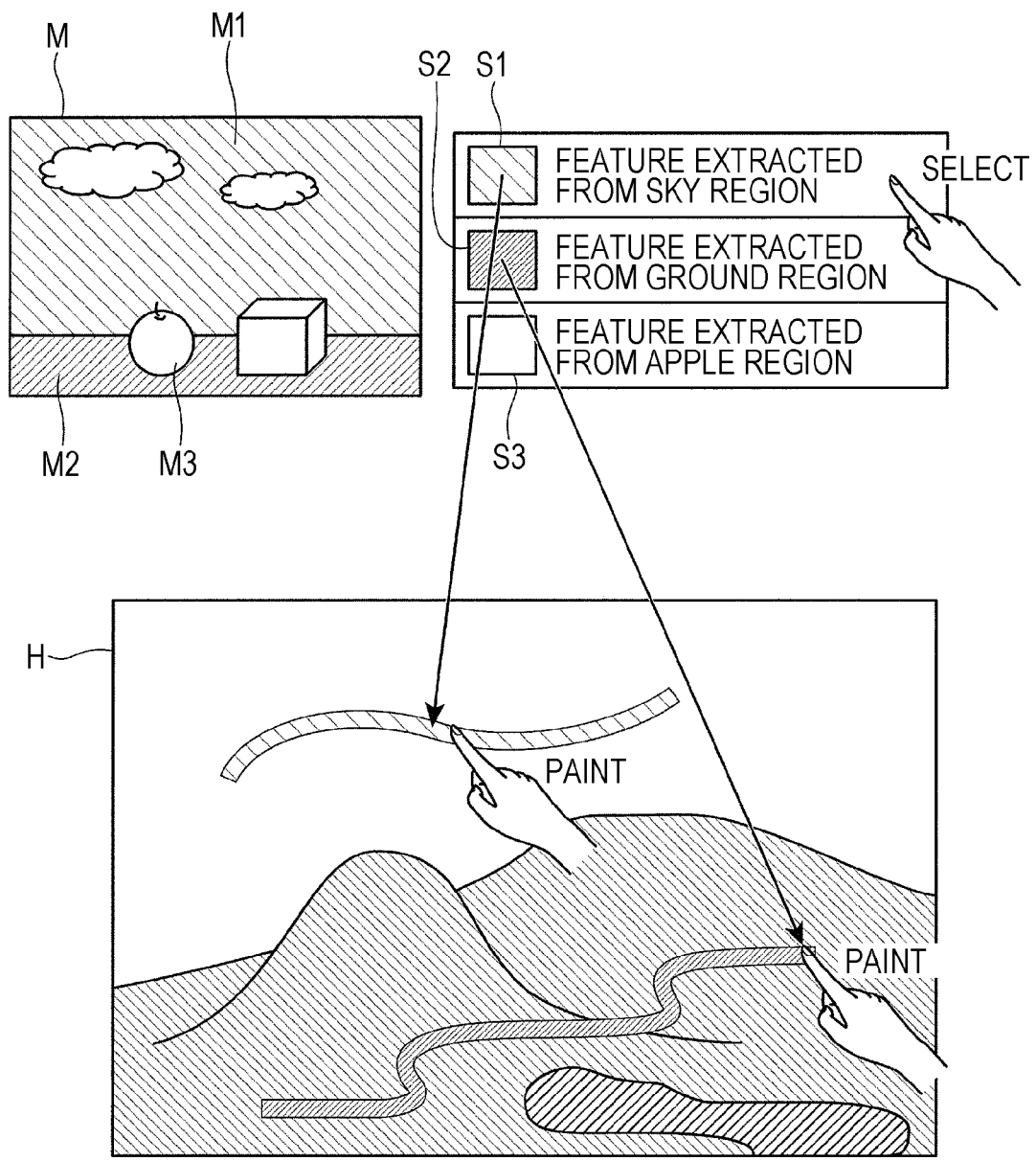
FIG. 9 is a diagram illustrating another example of the process performed in the second exemplary embodiment.

FIG. 9 is a diagram illustrating another example of the process performed in the second exemplary embodiment.

FIG. 9 illustrates an example where a user touches a process target image H with a finger or a stylus and moves the finger or the stylus on the process target image H before releasing the finger or the stylus from the process target image H. In this case, the move operation is an operation for painting on the process target image H, and an image adjusted to the image quality of the image S1 or an image adjusted to the image quality of the image S2 is temporarily displayed on the process target image H in a portion corresponding to a path along which the finger or the stylus has moved. That is, the image temporarily displayed does not have a circle shape but the shape of the path. When the user releases the finger or the stylus that is in contact with the process target image H, image processing is performed on the process target image H.

Third Exemplary Embodiment

A description of a third exemplary embodiment is given next.

In the second exemplary embodiment, the feature value extraction unit 13 specifies an image region in a sample image which has an impression that a user desires to use as a sample, and feature values are extracted from the specified image region. In this exemplary embodiment, a user specifies an image region in a process target image on which the user desires to perform image processing, and feature values are extracted from the specified image region. Then, image processing is selectively performed on the specified image region. Note that a case is described hereinafter where this process is performed in addition to the process in the second exemplary embodiment.

An example of a functional configuration of the image processing apparatus 1 in this exemplary embodiment is similar to that illustrated in FIG. 2. Further, the functions of the user operation accepting unit 11, the color conversion unit 12, and the image display unit 15 are similar to those in the second exemplary embodiment. Accordingly, a description that focuses on processes performed by the feature value extraction unit 13 and the image adjustment unit 14 which are different from those performed in the second exemplary embodiment is given below.

In this exemplary embodiment, the feature value extraction unit 13 selects a second image region that is a predetermined area from a location specified by a user touching a process target image, for example, and extracts feature values of the second image region as feature values of the process target image.

The second image region is a circle region that is centered at the location on the process target image which the user has touched and that has a radius of up to 10 pixels, for example. That is, in this exemplary embodiment, the user needs to touch an image region on which the user desires to perform image processing, not an arbitrary location on the process target image.

The feature value extraction unit 13 calculates the arithmetic means of the brightness components (I) and the chromaticity components (P, T) of pixels within the circle region.

The arithmetic means are calculated by using expressions 10 below.

In expressions 10, $I_{Tr(i,j)}$ represents the I value of each pixel within the circle region at a position (i, j). $P_{Tr(i,j)}$ represents the P value of each pixel within the circle region at the position (i, j). $T_{TR(i,j)}$ represents the T value of each pixel within the circle region at the position (i, j). N represents the number of pixels within the circle region.

$\mu_{I\_TR}$ represents the arithmetic mean of the I values of the pixels within the circle region. $\mu_{P\_TR}$ represents the arithmetic mean of the P values of the pixels within the circle region. $\mu_{T\_TR}$ represents the arithmetic mean of the T values of the pixels within the circle region.

$$\mu_{I\_TR} = \frac{1}{N}\sum(I_{TR(i,j)}), \mu_{P\_TR} = \frac{1}{N}\sum(P_{TR(i,j)}), \quad (10)$$

$$\mu_{T\_TR} = \frac{1}{N}\sum(T_{TR(i,j)})$$

The Euclidean distance, in an IPT color space, between each pixel in the sample image and the arithmetic mean of the pixel values of the pixels within the circle region is calculated by using expression 11 below, and the result is assumed to be a process target obtainment mask $L_{Tr(i,j)}$. In expression 11, F represents a function for limiting the process target obtainment mask $L_{T(i,j)}$ to a range between 0 and 1, and is used to adjust the dynamic range of the process target obtainment mask $L_{T(i,j)}$.

$$L_{T(i,j)} = F * \sqrt{(I_{i,j} - \mu_{I\_TR})^2 + (P_{i,j} - \mu_{P\_TR})^2 + (T_{i,j} - \mu_{T\_TR})^2} \quad (11)$$

Next, the image adjustment unit 14 adjusts the feature values of the process target image in accordance with the feature values of the sample image. Here, adjustment is performed by using expressions 12 to 14 below, for example. Expression 12 is an arithmetic expression for I values, where represents the I value of each pixel that constitutes an image in the process target image before adjustment at a position (i, j), and $I'_{i,j}$ represents the I value of each pixel that constitutes an image in the process target image after adjustment at the position (i, j).

Expression 13 is an arithmetic expression for P values, where represents the P value of each pixel that constitutes an image in the process target image before adjustment at the position (i, j), and $P'_{i,j}$ represents the P value of each pixel that constitutes an image in the process target image after adjustment at the position (i, j).

Expression 14 is an arithmetic expression for T values, where $T_{i,j}$ represents the T value of each pixel that constitutes an image in the process target image before adjustment at the position (i, j), and $T'_{i,j}$ represents the T value of each pixel that constitutes an image in the process target image after adjustment at the position (i, j).

In this case, an image region in the process target image for which the feature values are adjusted is limited by the process target obtainment mask $L_{T(i,j)}$. That is, an image region in the process target image for which image processing is performed is limited. Specifically, image processing is performed by performing a process for adjusting the feature values of the process target image to those of the sample image for an image region in the process target image which includes pixels having pixel values closer to the pixel values of the pixels within the second image region. That is, image processing is performed on an image region selected by the user.

$$I'_{i,j} = \left\{ (I_{i,j} - \mu_{Ir}) \frac{\sigma_{Ir}}{\sigma_{It}} + \mu_{Ir} \right\} * L_{T(i,j)} \qquad (12)$$

$$P'_{i,j} = \left\{ (P_{i,j} - \mu_{Pr}) \frac{\sigma_{Pr}}{\sigma_{Pt}} + \mu_{Pr} \right\} * L_{T(i,j)} \qquad (13)$$

$$T'_{i,j} = \left\{ (T_{i,j} - \mu_{Tr}) \frac{\sigma_{Tr}}{\sigma_{Tt}} + \mu_{Tr} \right\} * L_{T(i,j)} \qquad (14)$$

Figure 10:
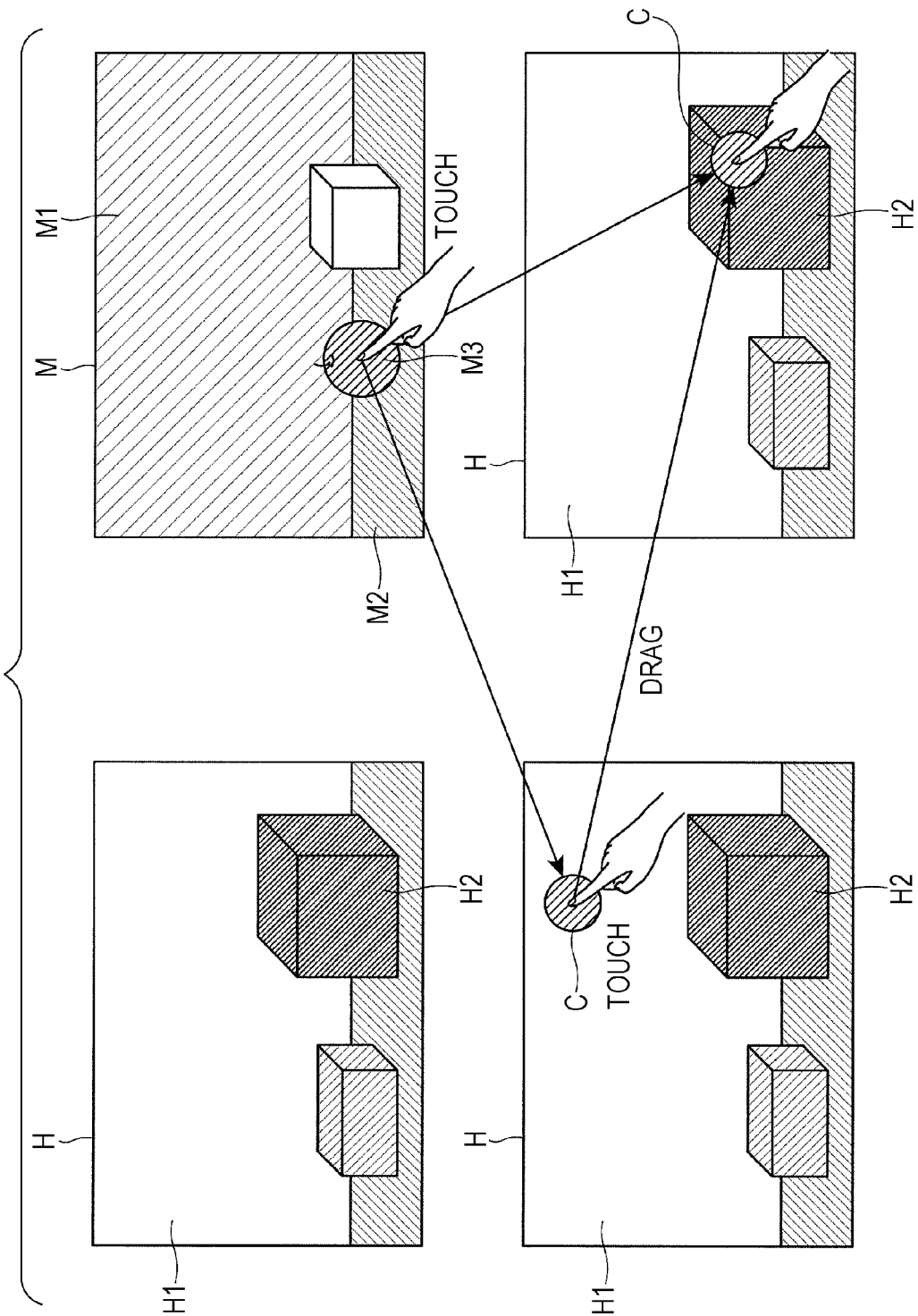
FIG. 10 is a diagram illustrating an example of a process performed in a third exemplary embodiment.

FIG. 10 is a diagram illustrating an example of a process performed in the third exemplary embodiment.

In FIG. 10, a sample image M is illustrated in the upper right part of FIG. 10, and a process target image H is illustrated in the upper left part of FIG. 10.

In this state, a user touches an apple image M3 with a finger or a stylus, for example. This touch operation is an operation for the user to specify the apple image M3, and is accepted by the user operation accepting unit 11.

Then, the user releases the finger or the stylus from the apple image M3, and touches a location in a sky image H1 in the process target image H, for example. This touch operation is an operation for the user to specify the sky image H1 in the process target image H, and is accepted by the user operation accepting unit 11.

The image display unit 15 temporarily displays an image adjusted to the feature values of the apple image M3 on the process target image H within a predetermined area, as illustrated in the lower left part of FIG. 10. Here, the adjusted image is displayed in a portion of the sky image H1 of the process target image H as a circle C. Then, the feature value extraction unit 13 extracts feature values of a circle region C2 (not illustrated) that is centered at the location which the user has touched and that has a radius of up to 10 pixels, and sets the process target obtainment mask $L_{T(i,j)}$. The circle region C2 may be the same area as the circle C or may be a different area.

Then, the user releases the finger or the stylus that is in contact with the sky image H1. This release operation is an operation for providing an instruction for performing image processing on the process target image H, and is accepted by the user operation accepting unit 11. The image display unit 15 performs image processing on the sky image H1 of the process target image H, and displays, on the display device, an image obtained after performing image processing on the process target image H. This image, namely, the process target image H obtained after image processing, is an image obtained by adjusting the impression of the sky image H1 to that of the apple image M3. In this case, image processing is performed only on the sky image H1 by using the process target obtainment mask $L_{T(i,j)}$.

When the user performs a drag operation of dragging to a box image H2 without releasing the finger or the stylus that is in contact with the sky image H1, the circle C is displayed in a portion of the box image H2 of the process target image H. In this case, the feature value extraction unit 13 redoes a process of extracting feature values. Further, the feature value extraction unit 13 newly sets the process target obtainment mask $L_{T(i,j)}$.

When the user releases the finger or the stylus that is in contact with the box image H2, the image display unit 15 performs image processing on the box image H2 of the process target image H, and displays, on the display device, an image obtained after performing image processing on the process target image H. This image, namely, the process target image H obtained after image processing, is an image in which the box image H2 has the same impression as the apple image M3 has. In this case, image processing is performed only on the box image H2 by using the process target obtainment mask $L_{T(i,j)}$.

Fourth Exemplary Embodiment

A description of a fourth exemplary embodiment is given next.

An example of a functional configuration of the image processing apparatus 1 in this exemplary embodiment is similar to that illustrated in FIG. 2. Further, the functions of the user operation accepting unit 11, the color conversion unit 12, and the feature value extraction unit 13 are similar to those in the first exemplary embodiment. Accordingly, a description is given of the image adjustment unit 14 and the image display unit 15 which are different from those in the first exemplary embodiment.

In the fourth exemplary embodiment, the image adjustment unit 14 determines the level of image processing in accordance with a third operation performed by a user on a process target image after the first operation and before the second operation.

Figure 11:
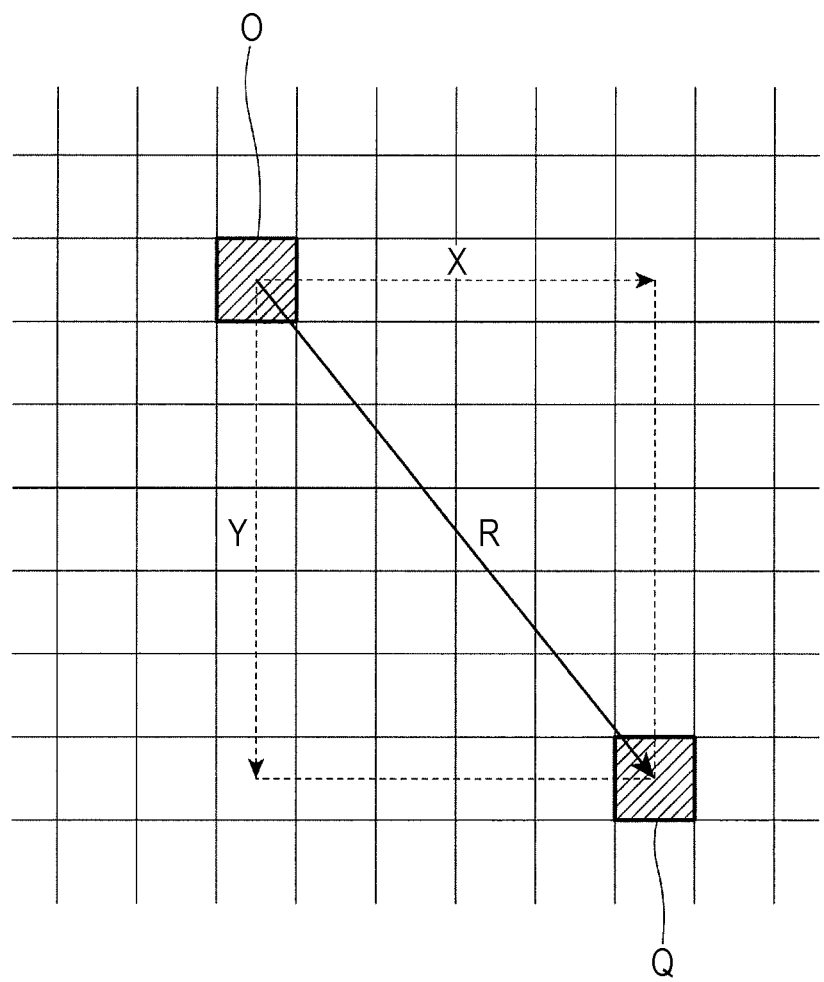
FIG. 11 is a diagram illustrating an example of a user operation performed on a process target image.

FIG. 11 is a diagram illustrating an example of a user operation performed on a process target image.

In this case, a user performs a drag operation of touching a process target image with a finger or a stylus first and thereafter moving the finger or the stylus on the process target image while keeping the finger or the stylus in contact with the process target image. At this time, a distance R that the finger or the stylus has moved is calculated from the coordinates (X, Y) of a point O that is a position which the user has touched first and the coordinates (X, Y) of a point Q that is a position of the finger or the stylus after movement. Note that this drag operation is an example of the above-described third operation that is performed by a user on a process target image.

The image adjustment unit 14 calculates an adjustment parameter α from the distance R by using expression 15 below. The adjustment parameter α represents the level of image processing to be performed. That is, the image adjustment unit 14 determines the level of image processing in accordance with the distance R over which the drag operation is performed by the user. In this case, the amount of change in pixel values (I, P, T) becomes larger as the adjustment parameter α increases. The amount of change in the pixel values (I, P, T) becomes smaller as the adjustment parameter α decreases. Note that, in expression 15, $C_1$ represents a constant for normalization and is a fixed value based on the image size of the process target image and the screen size of the display device. The adjustment parameter α is limited to a range between 0 and 1 by using $C_1$.

$$\alpha = C_1 * R \qquad (15)$$

Further, the image adjustment unit 14 adjusts the feature values of the process target image in accordance with the feature values of the sample image by using the adjustment parameter α.

This adjustment process is performed by using expressions 16 to 18 below, for example. In doing so, for each pixel at a position (i, j) which constitutes an image in the process target image, the brightness component (I) and the chromaticity components (P, T) are adjusted in accordance with the sample image on the basis of the adjustment parameter α.

$$I'_{i,j} = (1-\alpha) * I_{i,j} + \alpha * \left\{ (I_{i,j} - \mu_{It}) \frac{\sigma_{Ir}}{\sigma_{It}} + \mu_{Ir} \right\} \quad (16)$$

$$P'_{i,j} = (1-\alpha) * P_{i,j} + \alpha * \left\{ (P_{i,j} - \mu_{Pt}) \frac{\sigma_{Pr}}{\sigma_{Pt}} + \mu_{Pr} \right\} \quad (17)$$

$$T'_{i,j} = (1-\alpha) * T_{i,j} + \alpha * \left\{ (T_{i,j} - \mu_{Tt}) \frac{\sigma_{Tr}}{\sigma_{Tt}} + \mu_{Tr} \right\} \quad (18)$$

When the image display unit 15 temporarily displays an image obtained by adjusting the image quality of the process target image to that of the sample image on the process target image, the image display unit 15 changes the size of the temporarily displayed image in accordance with the distance R over which the drag operation is performed by the user.

Figure 12:
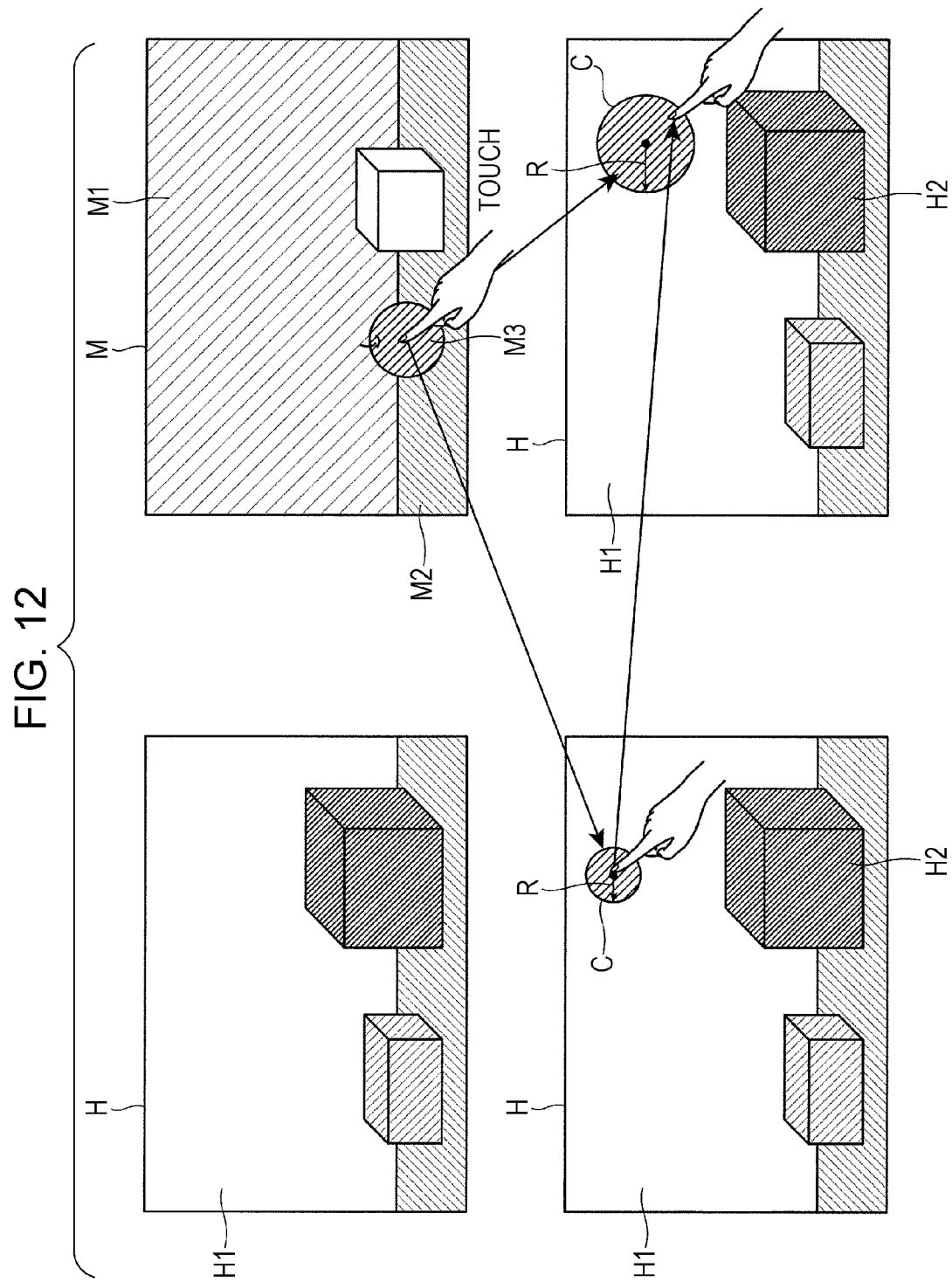
FIG. 12 is a diagram illustrating images displayed on a display device by an image display unit.

FIG. 12 is a diagram illustrating images displayed on the display device by the image display unit 15 in this case.

FIG. 12 illustrates a case where, in the operations performed by the user as illustrated in FIG. 10, the user touches the sky image H1 with the finger or the stylus and thereafter performs the operation as described with reference to FIG. 11. Here, in a case where the distance R becomes longer, the circle C that is displayed above the box image H2 becomes larger accordingly. In a case where the distance R becomes shorter, the circle C that is displayed above the box image H2 becomes smaller accordingly. As a result, the user intuitively grasps the level of image processing.

Fifth Exemplary Embodiment

A description of a fifth exemplary embodiment is given next.

Although the size of an image that is temporarily displayed on a process target image is changed in accordance with a user operation in the fourth exemplary embodiment, the shape of the temporarily displayed image is also changed in the fifth exemplary embodiment.

An example of a functional configuration of the image processing apparatus 1 in this exemplary embodiment is similar to that illustrated in FIG. 2. Further, the functions of the user operation accepting unit 11, the color conversion unit 12, and the feature value extraction unit 13 are similar to those in the first exemplary embodiment. Accordingly, a description is given of the image adjustment unit 14 and the image display unit 15 which are different from those in the first exemplary embodiment.

Figure 13:
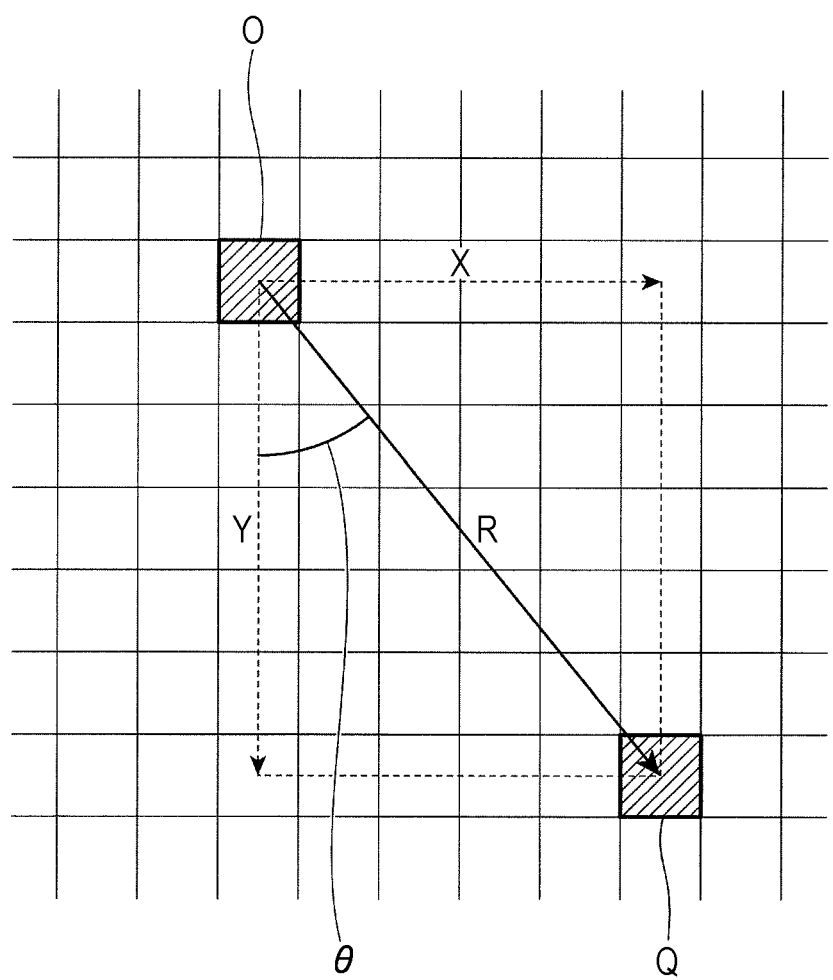
FIG. 13 is a diagram illustrating an example of a user operation performed on a process target image.

FIG. 13 is a diagram illustrating an example of a user operation performed on a process target image.

A user performs an operation of touching a process target image with a finger or a stylus first, for example, and thereafter moving the finger or the stylus on the process target image while keeping the finger or the stylus in contact with the process target image similarly to the case illustrated in FIG. 11. Then, the distance R that the finger or the stylus has moved is calculated from the coordinates (X, Y) of the point O and the coordinates (X, Y) of the point Q. In this exemplary embodiment, the angle of the line O-P relative to the Y direction is assumed to be a rotation angle θ(rad).

The image adjustment unit 14 calculates the adjustment parameter α by using expression 15. The image adjustment unit 14 calculates a weighting parameter $\beta_{i,j}$ (0<$\beta_{i,j}$≤1) that is based on the frequency components of the process target image from the rotation angle θ by using expression 19 below. The weighting parameter $\beta_{i,j}$ is calculated for each position (i, j). The weighting parameter $\beta_{i,j}$ represents to what extent the edge portion remains displayed. That is, the image adjustment unit 14 determines the level of image processing in accordance with the rotation angle θ centered at the point O in the drag operation performed by the user. In this case, the edge portion becomes less visible as the weighting parameter $\beta_{i,j}$ increases. The edge portion remains displayed as the weighting parameter $\beta_{i,j}$ decreases.

$$\beta_{i,j} = \begin{cases} \dfrac{\theta}{2\pi} & \text{(if the pixel at the position } (i,j) \text{ is included} \\ & \text{in a region containing a large number of} \\ & \text{high-frequency components)} \\ 1.0 & \text{(otherwise)} \end{cases} \quad (19)$$

The weighting parameter $\beta_{i,j}$ is constant (1.0) for an even region that contains a large number of low-frequency components, and increases in accordance with the rotation angle θ for a region that contains a large number of high-frequency components. In expression 19, whether a region contains a large number of high-frequency components is determined by using a high-pass filter.

Further, the image adjustment unit 14 adjusts the feature values of the process target image in accordance with the feature values of the sample image by using the adjustment parameter α and the weighting parameter $\beta_{i,j}$.

This adjustment process is performed by using expressions 20 to 22 below, for example. In doing so, for each pixel at a position (i, j) which constitutes an image in the process target image, the brightness component (I) and the chromaticity components (P, T) are adjusted in accordance with the sample image on the basis of the adjustment parameter α and the weighting parameter $\beta_{i,j}$.

$$I'_{i,j} = \beta_{i,j} * I_{i,j} + (1.0 - \beta_{i,j}) \left[ \alpha * I_{i,j} + (1-\alpha) * \left\{ (I_{i,j} - \mu_{It}) \frac{\sigma_{Ir}}{\sigma_{It}} + \mu_{Ir} \right\} \right] \quad (20)$$

$$P'_{i,j} = \beta_{i,j} * P_{i,j} + (1.0 - \beta_{i,j}) \left[ (1-\alpha) * P_{i,j} + \alpha * \left\{ (P_{i,j} - \mu_{Pt}) \frac{\sigma_{Pr}}{\sigma_{Pt}} + \mu_{Pr} \right\} \right] \quad (21)$$

$$T'_{i,j} = \beta_{i,j} * T_{i,j} + (1.0 - \beta_{i,j}) \left[ \alpha * T_{i,j} + (1-\alpha) * \left\{ (T_{i,j} - \mu_{Tt}) \frac{\sigma_{Tr}}{\sigma_{Tt}} + \mu_{Tr} \right\} \right] \quad (22)$$

When the image display unit 15 temporarily displays an image obtained by adjusting the image quality of the process target image to that of the sample image on the process target image, the image display unit 15 changes the size of the temporarily displayed image in accordance with the distance R over which the drag operation is performed by the user and changes the shape of the temporarily displayed image in accordance with the rotation angle θ in the drag operation performed by the user.

FIG. 14 is a diagram illustrating images displayed on the display device by the image display unit 15 in this case.

FIG. 14 illustrates a case where, in the operations performed by the user as illustrated in FIG. 12, the user touches the sky image H1 with the finger or the stylus and thereafter performs the operation as described with reference to FIG. 13. Here, in a case where the distance R becomes longer, the circle C that is displayed above the box image H2 becomes larger accordingly. In a case where the distance R becomes shorter, the circle C becomes smaller accordingly. In a case where the rotation angle θ becomes larger, the circle C becomes deformed to a larger extent accordingly. In a case where the rotation angle θ becomes smaller, the circle C becomes deformed to a smaller extent accordingly. As a result, the user intuitively grasps the two levels of image processing.

Note that, as the weighting parameter $\beta_{i,j}$ described above, a value $f_{i,j}$ that indicates what type of frequency component is dominant in the region may be used. The value $f_{i,j}$ is calculated by using expression 23 below. In a case where the weighting parameter $\beta_{i,j}$ calculated by using expression 23 is used, image processing results in a smoother image. The value $f_{i,j}$ is a value calculated from the contribution of the frequency component of each pixel, and is a coefficient calculated by band decomposition or the like using a Difference-of-Gaussian (DoG) filter. Note that, in expression 23, $C_2$ represents a coefficient used in normalization in order to satisfy the condition of $0<\beta_{i,j}\leq1.0$.

$$\beta_{i,j} = C_2 \cdot \frac{\theta}{2\pi} \cdot f_{i,j} \quad (23)$$

Description of Program

The process performed by the image processing apparatus 1 according to the exemplary embodiments is implemented by software and hardware resources working together. That is, a central processing unit (CPU) not illustrated which is provided inside the image processing apparatus 1 executes a program for implementing functions of the image processing apparatus 1 to thereby implement the functions.

Accordingly, the process performed by the image processing apparatus 1 may be regarded as a program that causes a computer to implement: an image information obtaining function of obtaining image information regarding a process target image on which image processing for adjusting the impression of an image to the impression of a sample image is performed, and image information regarding the sample image; a feature value extraction function of extracting feature values of the process target image and feature values of the sample image; an image adjustment function of adjusting the feature values of the process target image to the feature values of the sample image; and an image display function of temporarily displaying, on the process target image, an image obtained after image processing of adjusting the feature values of the process target image to the feature values of the sample image, within a predetermined area in response to the first operation that is performed by a user on the process target image, and thereafter displaying the entire image obtained after image processing in response to the second operation that is performed by the user on the process target image.

Note that, in the example described above, although an arithmetic mean is used as the mean, the mean is not limited to an arithmetic mean and may be a geometric mean or the like. In the example described above, although a variance is used as the distribution, the distribution is not limited to a variance, and various indicators, such as a root-mean-square or a standard deviation may be used.

In the example described above, although the color conversion unit 12 converts RGB data into IPT data, the data is not limited to IPT data and may be chromaticity data in any color space as long as the chromaticity data is separated into a brightness component and a chromaticity component. For example, RGB data may be converted into CIE L*a*b* data, Lαβ data, CAM02 data, HSV data, or the like instead of IPT data. By using a color space, such as a CIE L*a*b* color space, which is perceptually uniform for a user's vision, or by using color conversion based on CIECAM2 or iCAM which takes into consideration a user's psychological vision and a user's physical vision, it is possible to obtain more appropriate feature values, and the impression after image processing becomes more natural.

In the example described above, although the case is described where image processing is performed while changing the brightness component and the chromaticity components, image processing is not limited to such image processing. For example, image processing for adjusting the glossiness of a process target image to that of a sample image may be performed by obtaining glossiness information from the sample image and the process target image and changing the glossiness of the process target image.

In the second exemplary embodiment and the third exemplary embodiment, although the feature value obtainment mask $M_{R(i,j)}$ and the process target obtainment mask $L_{T(i,j)}$ are used in order to limit the image region, the mask generation method is not limited to such a method. For example, a mask may be generated by using a method of partitioning an image into plural regions, such as a region growing method.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    an image information obtaining unit that obtains image information regarding a process target image on which image processing for adjusting an impression of an image to an impression of a sample image is performed, and image information regarding the sample image;
    a feature value extraction unit that extracts feature values of the process target image and feature values of the sample image;
    an image adjustment unit that adjusts the feature values of the process target image to the feature values of the sample image; and
    an image display unit that temporarily displays, on the process target image, an image obtained by adjusting the feature values of the process target image to the feature values of the sample image, within a predetermined area in response to a first operation that is performed by a user on the process target image, and thereafter displays an entire image obtained after image processing in response to a second operation that is performed by the user on the process target image, wherein
    the feature value extraction unit calculates a mean and a distribution of pixel values of pixels that constitute the process target image as the feature values of the process target image, and calculates a mean and a distribution of pixel values of pixels that constitute the sample image as the feature values of the sample image.

2. The image processing apparatus according to claim 1, wherein
the image display unit displays a predetermined figure as the predetermined area.

3. The image processing apparatus according to claim 1, wherein
the feature value extraction unit selects a first image region that is a predetermined area from a location that is in the sample image and that is specified by the user, and extracts feature values of the first image region as the feature values of the sample image.

4. The image processing apparatus according to claim 1, wherein
the feature value extraction unit selects, from the process target image, a second image region that is a predetermined area from a location specified by the user in the first operation, and extracts feature values of the second image region as the feature values of the process target image, and
the image adjustment unit adjusts the feature values of the process target image to the feature values of the sample image, in an image region in the process target image, the image region including pixels having pixel values that are closer to pixel values of pixels in the second image region.

5. The image processing apparatus according to claim 1, wherein
the image adjustment unit determines a level of the image processing in accordance with a third operation that is performed by the user on the process target image after the first operation and before the second operation.

6. The image processing apparatus according to claim 5, wherein
the image display unit changes a size and/or a shape of the predetermined area in accordance with the third operation.

7. The image processing apparatus according to claim 5, wherein
the third operation is an operation performed by the user dragging on the process target image.

8. The image processing apparatus according to claim 7, wherein
the image adjustment unit determines the level of the image processing in accordance with a distance over which the dragging is performed by the user as the third operation and/or a rotation angle in the dragging performed by the user as the third operation, the rotation angle being centered at a location which the user has touched or clicked in the first operation.

9. The image processing apparatus according to claim 1, wherein
the first operation is an operation performed by the user touching or clicking the process target image, and the second operation is an operation performed by the user releasing the process target image that is being touched or cancelling the clicking.

10. An image processing system comprising:
a display device that displays an image; and
an image processing apparatus that performs image processing on image information regarding the image displayed on the display device,
the image processing apparatus including
an image information obtaining unit that obtains image information regarding a process target image on which image processing for adjusting an impression of an image to an impression of a sample image is performed, and image information regarding the sample image,
a feature value extraction unit that extracts feature values of the process target image and feature values of the sample image,
an image adjustment unit that adjusts the feature values of the process target image to the feature values of the sample image, and
an image display unit that temporarily displays, on the process target image, an image obtained by adjusting the feature values of the process target image to the feature values of the sample image, within a predetermined area in response to a first operation that is performed by a user on the process target image, and thereafter displays an entire image obtained after image processing in response to a second operation that is performed by the user on the process target image, wherein
the feature value extraction unit calculates a mean and a distribution of pixel values of pixels that constitute the process target image as the feature values of the process target image, and calculates a mean and a distribution of pixel values of pixels that constitute the sample image as the feature values of the sample image.

11. A non-transitory computer readable medium storing a program causing a computer to execute a process for image processing, the process comprising:
obtaining image information regarding a process target image on which image processing for adjusting an impression of an image to an impression of a sample image is performed, and image information regarding the sample image;
extracting feature values of the process target image and feature values of the sample image;
adjusting the feature values of the process target image to the feature values of the sample image; and
temporarily displaying, on the process target image, an image obtained by adjusting the feature values of the process target image to the feature values of the sample image, within a predetermined area in response to a first operation that is performed by a user on the process target image, and thereafter displaying an entire image obtained after image processing in response to a second operation that is performed by the user on the process target image, wherein
the extracting of the feature values includes calculating a mean and a distribution of pixel values of pixels that constitute the process target image as the feature values of the process target image, and calculating a mean and a distribution of pixel values of pixels that constitute the sample image as the feature values of the sample image.

12. An image processing method comprising:
obtaining image information regarding a process target image on which image processing for adjusting an impression of an image to an impression of a sample image is performed, and image information regarding the sample image;
extracting feature values of the process target image and feature values of the sample image;
adjusting the feature values of the process target image to the feature values of the sample image; and
temporarily displaying, on the process target image, an image obtained by adjusting the feature values of the process target image to the feature values of the sample image, within a predetermined area in response to a first operation that is performed by a user on the process target image, and thereafter displaying an entire image obtained after image processing in response to a second operation that is performed by the user on the process target image, wherein the extracting of the feature values includes calculating a mean and a distribution of pixel values of pixels that constitute the process target image as the feature values of the process target image, and calculating a mean and a distribution of pixel values of pixels that constitute the sample image as the feature values of the sample image.

* * * * *